Feb. 7, 1939. M. COOPER 2,146,173
DISPLAY DEVICE
Filed Nov. 27, 1935
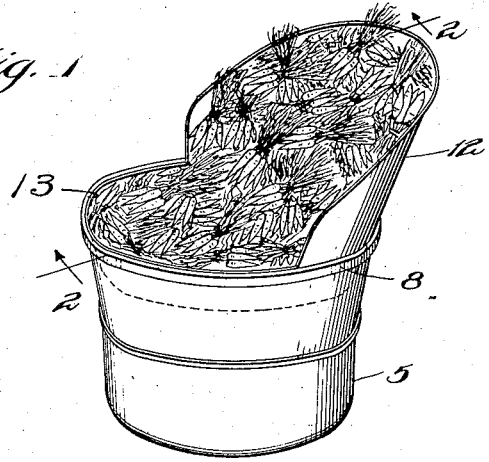
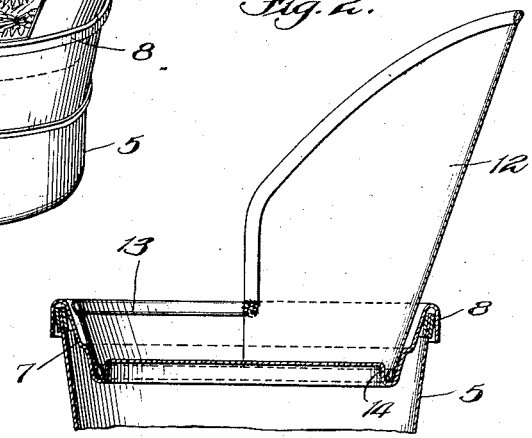
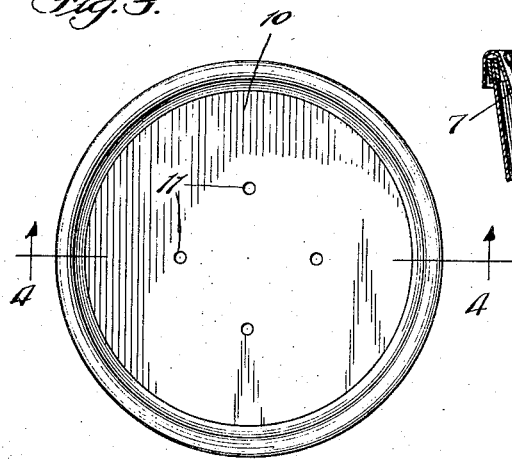
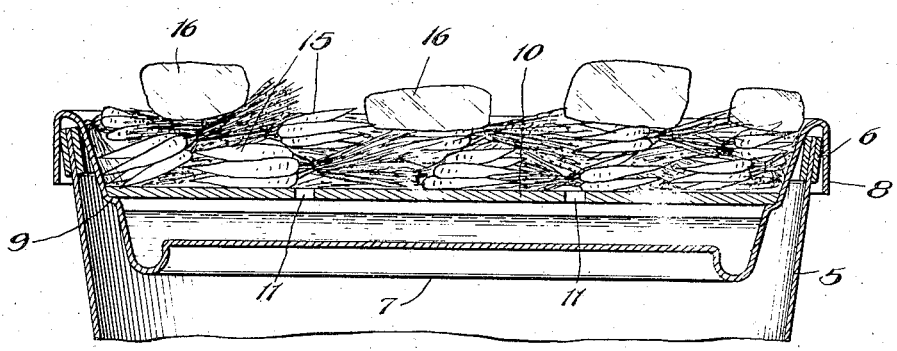
INVENTOR.
Morris Cooper
BY Glenn S. Noble
ATTORNEY.

Patented Feb. 7, 1939

2,146,173

UNITED STATES PATENT OFFICE 2,146,173

DISPLAY DEVICE

Morris Cooper, Chicago, Ill.

Application November 27, 1935, Serial No. 51,767

4 Claims. (Cl. 217—124)

This invention relates to devices for use with containers for displaying vegetables, fruits or other articles, and particularly intended for use in grocery, vegetable or fruit stores. It is generally understood that when fruit or vegetables are being sold from baskets the demand decreases as the contents are lowered. In other words, it is more difficult to sell the goods after the baskets or containers have become more or less emptied. The present invention relates to means adapted to be applied to baskets or containers whereby the fruit or vegetables may be better displayed and also more effectively kept in fresh condition.

Accordingly the objects of this invention are to provide a pan or shallow receptacle which is adapted to be applied to baskets or the like, whereby the contents of the basket may be removed and placed in the pan to simulate a full basket; to provide an attachment or device of the character set forth whereby greens, vegetables, or the like, may be kept on display and moistened or iced without deterioration; to provide a display device for baskets having a flange or bead to cover the upper edge of the basket to improve the appearance of the same and also to prevent injury to clothes or damage to persons coming in contact with the basket; to provide a shallow pan to be supported on a basket and having an upwardly extending shield or wall for better displaying vegetables or the like; and to provide such other advantages and novel features as will appear more fully from the following description taken in connection with the accompanying drawing.

As shown in the drawing,

Figure 1 is a perspective view showing a basket with my display device mounted thereon;

Figure 2 is a longitudinal sectional view of the arrangement shown in Figure 1 shown on an enlarged scale;

Figure 3 is a plan of the pan showing the false bottom therein; and

Figure 4 is an enlarged sectional view taken on the line 4—4 of Figure 3.

As shown in the drawing, 5 is a container such as a basket, of the kind commonly used for the purposes indicated, these baskets having bands or strips 6 around the top which are frequently splintered or rough. My improved pan or shallow receptacle 7 extends for a short distance in the basket and has a flange or bead 8 which preferably extends down well over the binding strip 6 so as to improve the looks of the basket and also to prevent clothing from becoming caught on the splinters or rough portions of such bands.

The pan or receptacle 7 preferably has an annular shoulder 9 for receiving a false bottom or partition 10 which may be made of any suitable material but which is preferably made of wood. This disc or partition fits loosely in the pan so that water may flow down around the outer edges, and is also provided with holes 11 which further drain it.

In some cases as for displaying spinach, carrots, greens, or the like, it is desirable to elevate or present a larger surface. In order to accomplish this I provide a back wall or shield 12 which preferably extends about half-way around the basket and has a narrow front portion 13, thus forming a ring at the bottom which fits in a groove 14 formed in the bottom of the pan or receptacle as readily seen from Figure 2.

The pan or shallow receptacle 7 may be used alone and the articles to be displayed may be gradually removed from the basket or container and placed therein so as to keep a pleasing display of such goods, and to prevent an empty aspect of the basket. The pan or receptacle may be made of any suitable material such as fibre, papier-mâché or metal, but is preferably made of metal with the outer rim 8 polished, which enhances the looks of the display.

When more perishable articles such as greens or carrots, or the like, are to be displayed, the disc or false bottom 10 may be positioned as shown in Figure 4, with the vegetables 15 thereon and such vegetables may be sprayed with water or ice 16 placed in contact therewith to keep the vegetables fresh. The excess water or melted ice will pass down around the edge of the bottom 10 or through the holes 11 and will be caught in the pan 7 so that the goods do not become water-soaked. When a more extensive display is desired the false bottom is removed and the shield or support 12 is positioned in the pan as shown in Figures 1 and 2 and used as above suggested and illustrated in Figure 1.

I have shown a preferred arrangement of my display device but the same may be modified for various goods or articles and therefore I do not wish to be limited to the particular form shown and described except as specified in the following claims, in which I claim:

1. The combination with a basket, of a shallow pan fitting in the top thereof, means on the pan engaging with the top of the basket, and a perforated disc having a smooth upper surface, detachably engaging with the pan at a distance from the bottom thereof and providing means for displaying vegetables or the like in the pan and permitting draining thereof without injury to the same.

2. The combination with a basket, of a shallow receptacle fitting in the top thereof and having an annular flange engaging with the upper edge of the basket, and provided with an annular groove in the bottom thereof, and a ring engaging with said groove and having an upwardly extending substantially semi-circular shield projecting a substantial distance above the top of the receptacle and serving as a wall for supporting articles to be displayed in the receptacle.

3. A new article of manufacture for use on baskets for fruit or the like, and such as usually have rough chines, comprising a shallow pan adapted to fit freely in the top of the basket and having a peripheral bead terminating in a downwardly projecting flange fitting freely over the edge of the basket and covering the chine, said pan portion being provided with an inwardly extending support and a detachable disc engaging with said support and spaced away from the bottom of the pan, said disc having drainage openings therethrough but presenting a substantially smooth upper surface whereby the fruit or the like placed thereon will not be injured by coming in contact therewith.

4. In a display device for use on baskets for displaying vegetables or fruit, the combination of a shallow pan adapted to fit freely in the basket and having a downwardly extending bead around the top thereof for engagement with the upper edge of the basket and to cover the same, and having an annular shoulder spaced at a distance from the bottom thereof, and a removable partition having a smooth upper surface but provided with drainage openings, adapted to engage with said shoulder whereby the partition is spaced away from the bottom of the pan to permit moisture to drip from the articles displayed thereon into the bottom of the pan.

MORRIS COOPER.